(12) United States Patent
Tran

(10) Patent No.: US 8,000,666 B2
(45) Date of Patent: Aug. 16, 2011

(54) METHOD AND APPARATUS FOR IDENTIFYING UNUSED RF CHANNELS

(75) Inventor: Le Thu Tran, Redwood City, CA (US)

(73) Assignee: Monster Cable Products, Inc., Brisbane, CA (US)

( * ) Notice: Subject to any disclaimer, the term of this patent is extended or adjusted under 35 U.S.C. 154(b) by 347 days.

(21) Appl. No.: 11/690,736

(22) Filed: Mar. 23, 2007

(65) Prior Publication Data

US 2008/0064348 A1     Mar. 13, 2008

Related U.S. Application Data

(63) Continuation of application No. 11/531,018, filed on Sep. 12, 2006.

(51) Int. Cl.
*H04B 1/18* (2006.01)
*H04B 1/00* (2006.01)
*H04B 7/00* (2006.01)

(52) U.S. Cl. ............ 455/161.1; 455/277.1; 455/42; 455/179.1

(58) Field of Classification Search ........... 455/120, 455/123, 125
See application file for complete search history.

(56) References Cited

U.S. PATENT DOCUMENTS

| | | | |
|---|---|---|---|
| 4,712,250 A | 12/1987 | Michaels et al. | |
| 5,319,716 A | 6/1994 | McGreevy | |
| 5,448,757 A | 9/1995 | Hirata | |
| 5,491,839 A | 2/1996 | Schotz | |
| 5,771,441 A | 6/1998 | Alstatt | |
| 5,867,794 A | 2/1999 | Haynes et al. | |
| 5,970,390 A * | 10/1999 | Koga et al. | 455/42 |
| 6,023,616 A | 2/2000 | Briskman | |
| 6,163,711 A | 12/2000 | Juntunen et al. | |
| 6,272,328 B1 | 8/2001 | Nguyen et al. | |
| 6,493,546 B2 | 12/2002 | Patsiokas | |
| 6,591,085 B1 | 7/2003 | Grady | |
| 6,671,494 B1 | 12/2003 | James | |
| 6,782,239 B2 * | 8/2004 | Johnson et al. | 455/42 |
| 6,810,233 B2 * | 10/2004 | Patsiokas | 455/3.02 |
| 7,062,238 B2 * | 6/2006 | Glaza | 455/161.1 |
| 7,082,203 B1 | 7/2006 | Drakoulis et al. | |
| 2002/0058475 A1 | 5/2002 | Patsiokas | |
| 2003/0026439 A1 | 2/2003 | Yamamoto | |
| 2003/0036357 A1 * | 2/2003 | McGowan | 455/62 |
| 2003/0236075 A1 | 12/2003 | Johnson et al. | |
| 2004/0038716 A1 | 2/2004 | Gass | |
| 2004/0058649 A1 | 3/2004 | Grady | |
| 2004/0117442 A1 | 6/2004 | Thielen | |
| 2005/0014536 A1 | 1/2005 | Grady | |
| 2005/0047071 A1 | 3/2005 | Tse Chun Hin | |
| 2005/0049009 A1 | 3/2005 | Yamamoto | |

(Continued)

FOREIGN PATENT DOCUMENTS

WO    WO 97/38496    10/1997

(Continued)

*Primary Examiner* — Temesgh Ghebretinsae
*Assistant Examiner* — Gennadiy Tsvey
(74) *Attorney, Agent, or Firm* — LaRiviere, Grubman & Payne, LLP

(57) ABSTRACT

A wireless connection apparatus which scans radio frequency bands for local quiet unused, vacant, or unassigned frequencies which the apparatus can use, on a temporary basis, to establish a link for communicating between a portable multimedia device and a nearby RBDS/RDS configured receiver or source. The apparatus does not interfere with or utilize frequencies actively in use by an assigned user.

13 Claims, 4 Drawing Sheets

U.S. PATENT DOCUMENTS

| | | |
|---|---|---|
| 2005/0123147 A1 | 6/2005 | Everett et al. |
| 2005/0143139 A1* | 6/2005 | Park et al. .................. 455/567 |
| 2005/0190304 A1* | 9/2005 | Ryu et al. .................. 348/724 |
| 2005/0249357 A1 | 11/2005 | Schedivy |
| 2005/0282498 A1 | 12/2005 | Chen |
| 2006/0205349 A1 | 9/2006 | Passier et al. |
| 2006/0223467 A1 | 10/2006 | Mason |
| 2007/0087683 A1* | 4/2007 | Hsieh et al. .................. 455/3.01 |
| 2008/0146159 A1* | 6/2008 | Faltman et al. ............. 455/67.11 |
| 2008/0200125 A1* | 8/2008 | Caldwell et al. ................ 455/42 |
| 2009/0054020 A1* | 2/2009 | Mason ...................... 455/127.5 |

FOREIGN PATENT DOCUMENTS

| | | |
|---|---|---|
| WO | WO03/010943 | 2/2003 |

* cited by examiner

METHOD AND APPARATUS FOR IDENTIFYING UNUSED RF CHANNELS

This application is a continuation of and claims priority to U.S. patent application Ser. No. 11/531,018 entitled "Method and Apparatus for Identifying Unused RF Channels" filed Sep. 12, 2006.

FIELD OF THE INVENTION

The present invention relates generally to the operating protocol for portable multimedia devices such as cell phones, multimedia players, personal digital devices, and the like. More specifically, the invention relates to the protocol for sending data between a multimedia player and a nearby receiver, and even more specifically for determining the operating frequencies for such communications links.

DESCRIPTION OF RELATED ART

The field of consumer electronics is expanding at a rapid rate, offering small, programmable digital communications and digital devices capable of reproducing music, displaying images, and performing multiple numerical data management tasks. These devices are interactive with one or more sources of, or play-back devices for analog or digital: music, images, text, or numerical data (herein collectively referred to as "data" for convenience, and not intended to limit in any way the nature of the data content). Generally, the portable multimedia devices receive data from a source, but may also transmit data to a nearby receiver. Typical currently appropriate receivers incorporate the European Radio Data System (RDS) or the United States Radio Broadcast Data System (RBDS) standards, or both. The portable multimedia devices transmit or receive either via a hardwire connection or wirelessly on a specific assigned frequency or within a designated frequency band, sharing the frequency and accompanying separation frequencies with an active assigned user. The plethora of available portable multimedia devices and the physical limitations of the available radio frequency bands inexorably leads to interference between portable devices and/or between portable devices and other frequency users.

Throughout the world, 87.5-108 MHz, or some portion thereof, is used as a Frequency Modulated (FM) broadcast band, with one exception; Japan uses a 76-90 MHz band. Users are allocated a channel within the band, typically with 0.1 MHz channel spacing. The assigned nominal center frequency of an FM broadcast station is usually an exact multiple of 100 kHz, however, individual countries may assign other nominal center frequencies (e.g. Italy uses multiples of 50 MHz). The bandwidth of a typical FM transmission is normally somewhat wider than these figures, and depends, in part, on whether stereo is used and the manner in which the peak deviation is regulated. Individual countries may specify other nominal band widths. Within the assigned bandwidth, subcarrier frequencies are used to carry information piggybacked on the FM station's carrier signal. These subcarriers are the basis of the RF transmission system, allowing for the transmission of information such as station or subject matter identification, emergency alerts, etc.

What is needed is a way to increase the available frequencies for portable multimedia devices to use more efficiently for short range communications with data sources and FM play-back devices.

SUMMARY OF THE INVENTION

Accordingly, the present invention is a portable multimedia device wireless connection apparatus which scans the commercial FM band for local unused, vacant, quiet or unassigned frequencies or clear channels which the apparatus can use, on a temporary basis, to establish a link for communicating between the portable multimedia device and a nearby FM radio receiver or other source. The scanner identifies frequencies with significantly lower signal strength than adjacent frequencies, or alternatively, identifies frequencies having a signal strength below a preset threshold that represents, for instance, the minimum acceptable signal level for any particular receiver. For convenience only, such frequencies, including the term clear channel, are herein referred to as "quiet" frequencies. The apparatus does not interfere with or utilize frequencies actively in use by an assigned user.

The apparatus (hereinafter referred to as a "scanner" for convenience and is not intended to limit in any way the function of the apparatus) is a low power FM transmitter configured to connect to a portable multimedia device which may be, for example an MP3 player or an iPod™, and contains circuitry to communicate with the portable multimedia device in both a receive and transmit mode. The operator manually directs the scanner to look for the most quiet frequency for use. The scanner searches the broadcast FM band for any inactive FM carrier frequency within a limited local range and selects a quiet frequency for use as a temporary connection between the portable multimedia device and a receiver. The scanner then establishes on that frequency an FM link between the portable multimedia device and the receiver for playback of data from the portable multimedia device through the receiver. In an alternative embodiment, the scanner will continue to monitor the frequency in use to detect any signal from an assigned user or excessive noise. If a signal or excessive noise is detected, the scanner will automatically transfer the connection between the portable multimedia device and the receiver to a different quiet frequency. The scanner will operate with a mobile receiver such as in an automobile or a portable radio (boom box) and in a fixed environment such as a home or office over an appropriately configured radio or television receiver.

The scanner may also serve as a connection between a data source and a portable multimedia device if appropriately configured. It may be specialized to function with one or more type or brand of portable multimedia device. It may further contain circuitry that will power the portable multimedia device and/or recharge the portable multimedia device batteries while facilitating playback from the portable multimedia device to a receiver, in the absence of data transfer for playback, or while the portable multimedia device is not otherwise operating.

BRIEF DESCRIPTION OF THE DRAWINGS

For a better understanding of the present invention, reference is made to the below referenced accompanying Drawing. Reference numbers refer to the same or equivalent parts of the present invention throughout the several figures of the Drawing.

DETAILED DESCRIPTION OF SELECTED EMBODIMENTS

Figure 1:
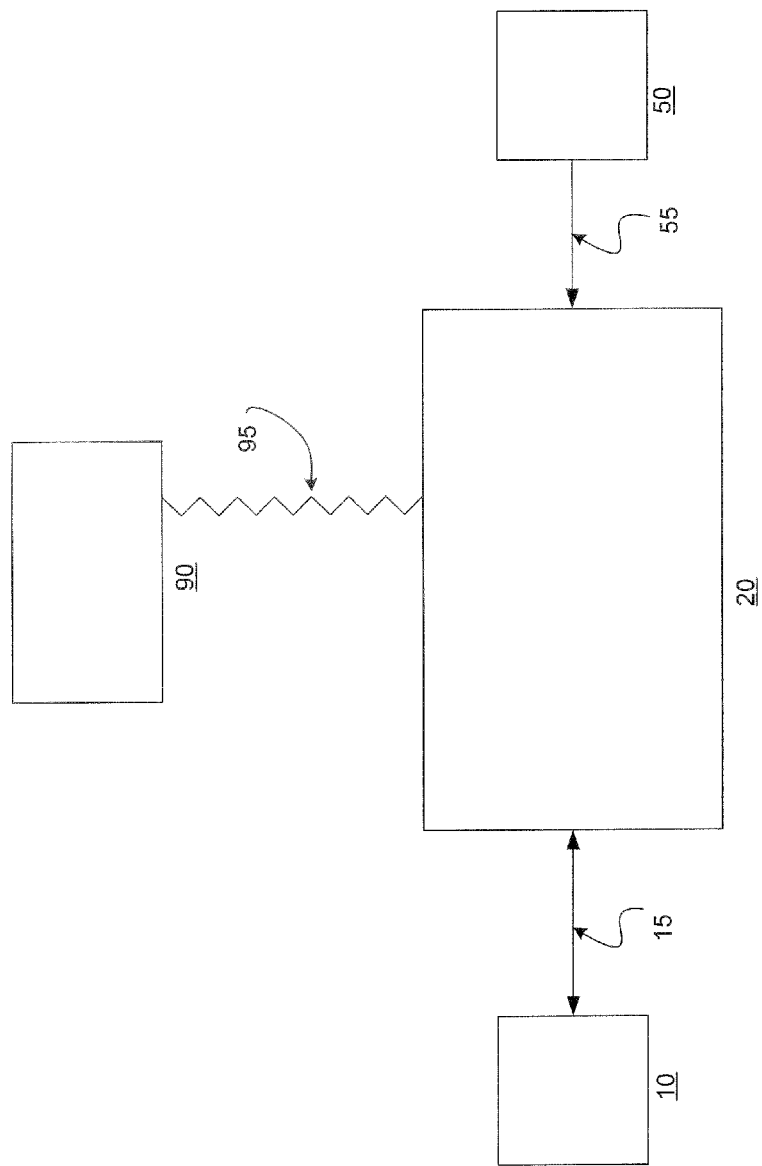
FIG. 1 is a block diagram showing the components of an exemplary wireless connection apparatus in accordance with the present invention.

The following description of the exemplary embodiment refers to a specific radio frequency band (the FM band). Other radio frequencies could be used in other embodiments. Discussion of a specific frequency range is not intended to limit the invention to such range. Referring now to FIG. 1, the components of an exemplary system for using the present scanner is shown in block diagram. Portable multimedia device 10 may be any appropriate digital data device such as an MP3 player, a game, a pager, an iPod™, or a Personal Data Assistant or cell phone, for example. Heretofore new portable multimedia devices not yet available may be supported by an embodiment using the principles of the present invention, and are contemplated by, and included in, the present invention. Portable multimedia device 10 is connected to scanner 20 by communications link 15 which may be either hardwire (a direct wire connection) or wireless. A hardwire connection would require an appropriate physical connector for the specific device 10. The connector may, for example, take the form of an electrical connector (e.g. a plug or socket), a cradle or holder, or a docking station, separately or in combination, and may also include some means to temporarily or permanently attach the connection to a vehicle or some other object. Further, an embodiment is contemplated with an electrical connector adapted to connect with a variety of cradles, holders, docking stations, and the like, to work with a variety of portable multimedia devices. For example, a multipin connector in which different pin combinations electrically connect with different devices.

Power adapter 50 is connected to scanner 20 via connection 55 which is typically hardwired. Connection 55 may alternatively be incorporated into scanner 20, forming a single integrated unit. Power adapter 50 connection 55 is preferably configured to plug into a vehicle power receptacle, but may also be configured to connect to a battery internal to scanner 20, an external battery pack having one or more batteries, a generator (for example a hand cranked emergency generator), or a typical household utility 120 vac power source. Scanner 20 may have appropriate circuits, indicators and switches to accommodate a variety of power sources.

Figure 2:
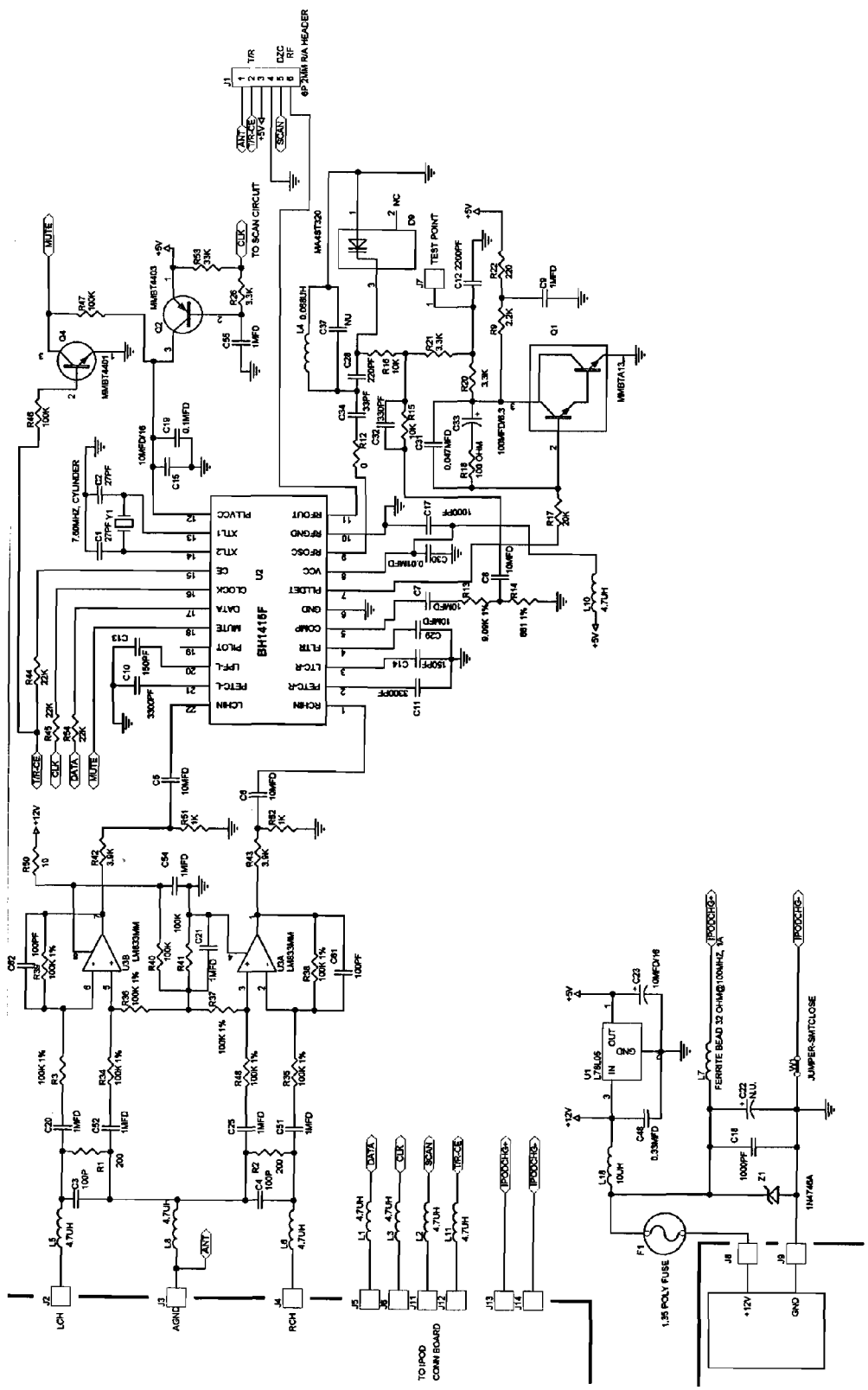
FIG. 2 is a schematic diagram of an exemplary main circuit board for the apparatus of FIG. 1.
Figure 3:
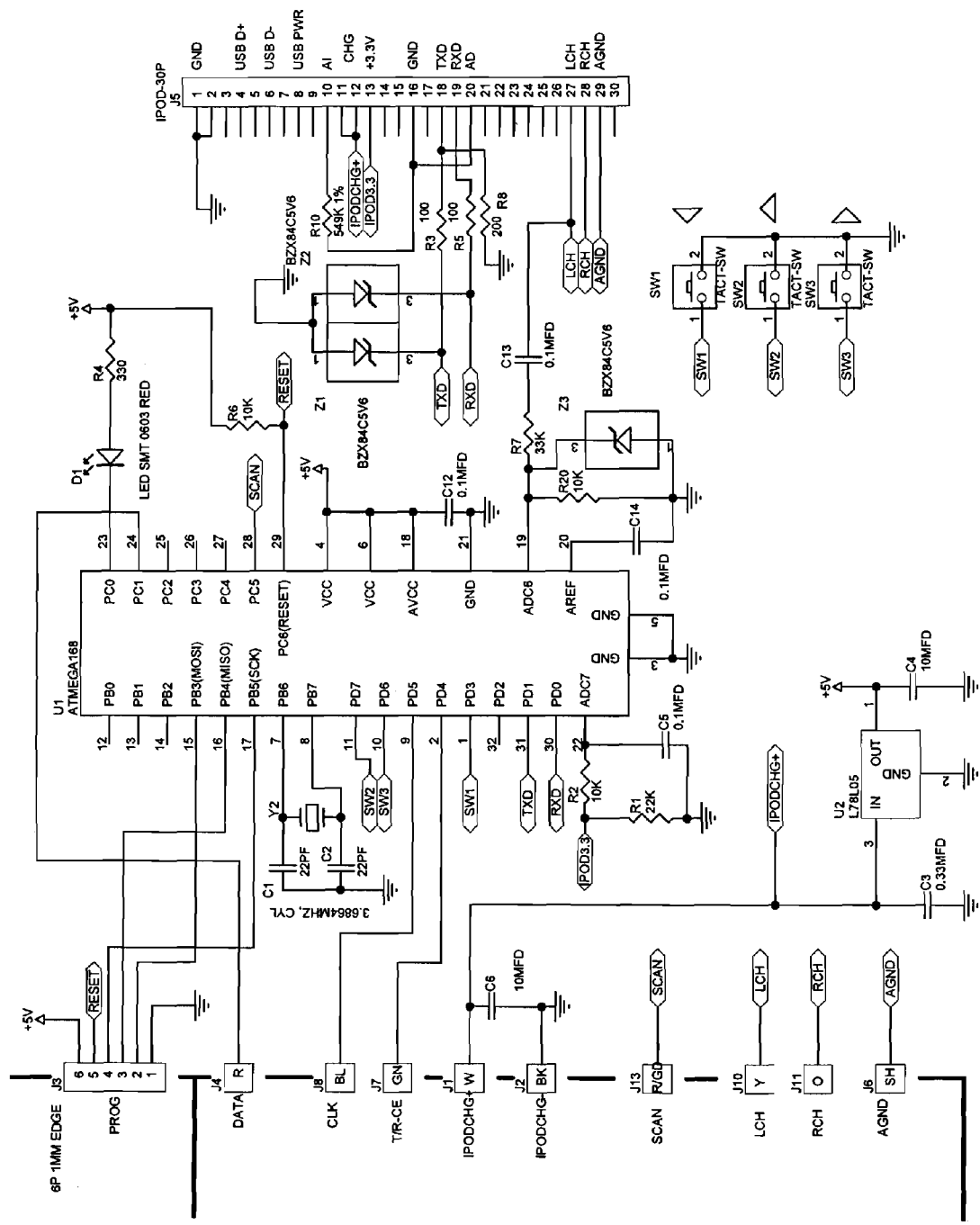
FIG. 3 is a schematic diagram of an exemplary connector circuit board for the apparatus of FIG. 1.

Scanner 20 typically is a conveniently-sized housing that contains circuits such as shown in FIG. 2 and FIG. 3 to convey digital data between portable multimedia device 10 and receiver 90 over communications links 15 and 95. Communication link 95 is preferably a low powered FM band frequency wireless link. Should other frequency bands be made available for public use, link 95 may be over a frequency in such a band. Similarly, link 95 may be over any public radio frequency available in any country, as allowed by law. Receiver 90 typically is an RBDS/RDS configured radio but may be any other appropriately configured device (e.g. a television set). Alternatively, receiver 90 may be a data source, such as a computer, audio player, or a video player for data transfer to portable multimedia device 10 through scanner 20. Scanner 20 may be specialized for one or more type, brand or model of portable multimedia device. Scanner 20 has indicators and controls available for an operator to select functions appropriate to the desired operations. In the exemplary embodiment, such controls include a manual control to initiate the band frequency scan mode. Alternative embodiments include computer-activated controls which initiate scans at designated intervals or events (e.g. noise levels exceed a standard, geographic changes of the receiver as in a moving vehicle, etc.).

Figure 4:
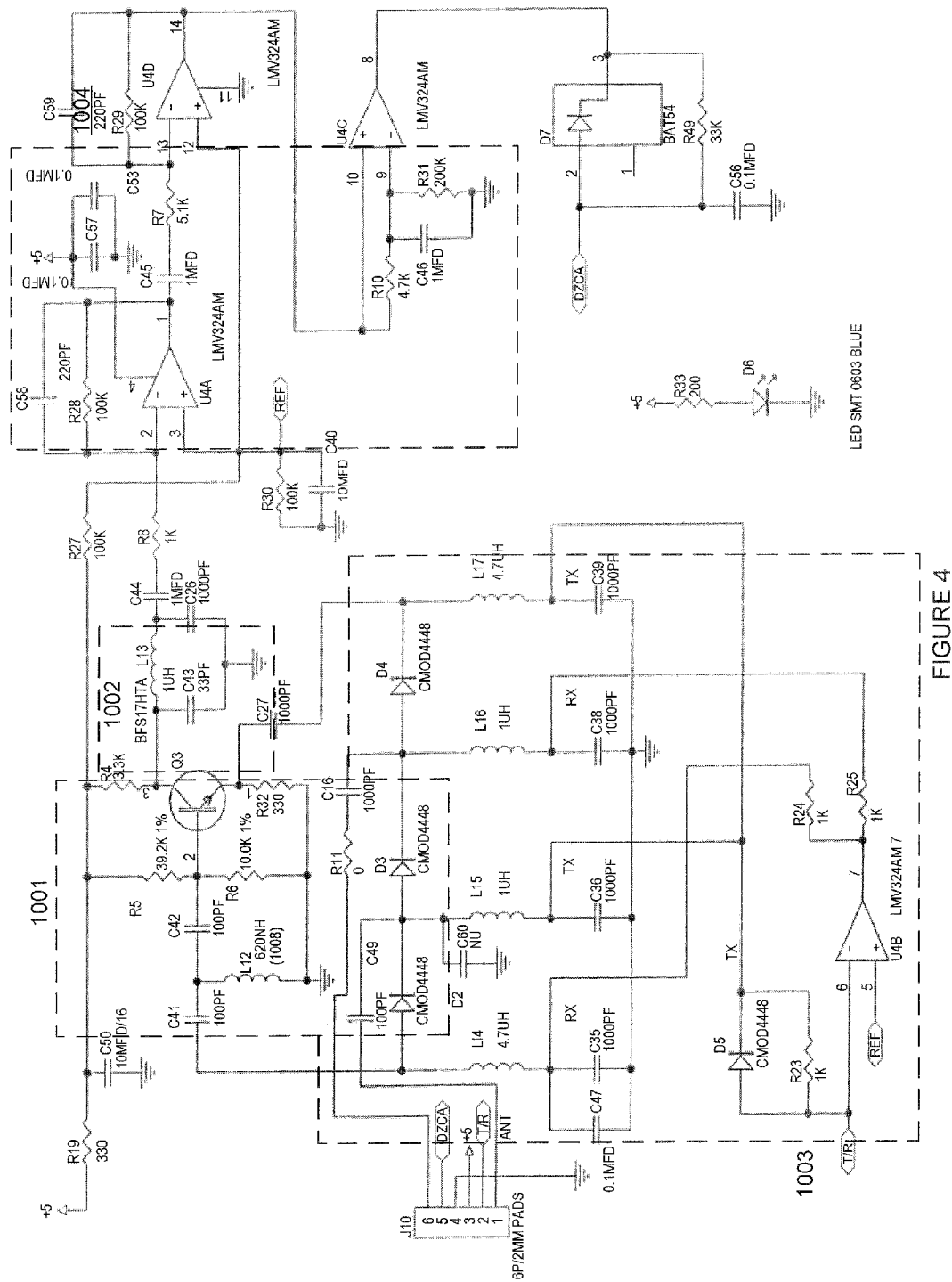
FIG. 4 is a schematic diagram of an exemplary scanner circuit for the apparatus of FIG. 1.

Referring now to FIG. 3 and FIG. 4, when the autoscan feature is initiated by the operator, the microprocessor (U1, FIG. 3) switches the FM transmitter to sequentially scan frequencies through the available RF band width. The microprocessor U1 then engages the scanner circuit (FIG. 4) to monitor the RF level at each frequency in the band. The microprocessor U1 uses a form of heterodyne conversion to downconvert the RF to baseband. As shown in FIG. 4, the RF is received through the "ANT" connection, coupled to the mixer (D2, D3, D4), amplified via Q3, low pass filtered by L13 and C43 and C26, further amplified through U4A, U4D and U4C, and finally converted into a DC level via D7. This level is fed to the microprocessor (U1, FIG. 3), which stores the level information. The microprocessor U1 scans through the broadcast band, recording the level at each frequency. It then determines the lowest signal, and reports that frequency back to the user as the desired channel for setting the transmitter and associated receiver.

Referring to FIG. 4, for further understanding the operation of the circuit, the following elements are identified: the RF mixer 1001, the passive low pass filter 1002, the transmit/receive switch 1003, and the base band audio amplifier and level detector 1005. The transmitter output frequency is mixed with the radio frequency on the antenna via diodes D2, D3, and D4 of FIG. 4. The output of the mixer is the sum and the difference of the radio frequency and the FM transmitter signal reference frequency. The mixer has an "if" output having a bandwidth to DC at the base of Q3 representing the frequency of the FM transmitter as a DC voltage at the output, namely the collector of Q3. The nearby modulations and the DC level will be at audio frequencies. Radio frequencies are low pass filtered by C43, L13 and C26. Detected audio frequency modulations are passed to input pin 2 of op amp U4A. The output signal of U4A is then representative of the signal levels at that transmitter frequency. The presence of audio modulation is detected and amplified by U4A, U4D, U4C. D7 converts audio modulation signal into DC signal at pin 2 of D7. This converted signal is returned to the microprocessor via a GPIO pin, namely pin PC5, on microprocessor U1, which controls the process. Microprocessor U1 the sweeps the transmitter frequency (already provided for) across the band of interest. A noise free, local RF link will be those frequencies having very little output during the sweep, thus detecting an FM channel available for receiving the desired signal from the audio source.

In a second embodiment, scanner 20 monitors the commercial FM frequency band for frequencies that are not in current use in the area where scanner 20 is operating. Upon identifying a quiet frequency, scanner 20 automatically establishes link 95 to connect portable multimedia device 10 to receiver 90. Link 95 is low powered and does not interfere with other users beyond a range of approximately 50 meters. If an outside signal or excessive noise on link 95 frequency is detected by scanner 20, the operator may command another scan and select cycle, or in an alternative embodiment, scanner 20 automatically switches link 95 frequency to a different quiet frequency for continuing communications between portable multimedia device 10 and receiver 90. Additional capabilities of scanner 20 may include identifying more than one quiet frequency and automatically configuring one or more preset controls to the identified frequency. Scanner 20 may scan the entire FM broadcast band, or alternatively, be provided with a computer capability that directs it to skip selected channels. That capability could include a database of probable unused frequencies.

While the present invention has been described in terms of a preferred embodiment, alternate circuits that perform the same function of scanner 20 are possible. Therefore, the invention should be interpreted as including all equivalents, alterations and permutations that perform the basic function of monitoring for, selecting, and automatically establishing communications over vacant radio frequencies.

Information as herein shown and described in detail is fully capable of attaining the above-described object of the invention, the presently preferred embodiment of the invention, and is, thus, representative of the subject matter which is broadly contemplated by the present invention. The scope of the present invention fully encompasses other embodiments which may become obvious to those skilled in the art, and is to be limited, accordingly, by nothing other than the appended claims, wherein reference to an element in the singular is not intended to mean "one and only one" unless explicitly so stated, but rather "one or more."

All structural and functional equivalents to the elements of the above-described preferred embodiment and additional embodiments that are known to those of ordinary skill in the art are hereby expressly incorporated by reference and are intended to be encompassed by the present claims. However, it should be readily apparent to those of ordinary skill in the art that various changes and modifications in form, apparatus material, and fabrication material detail may be made without departing from the spirit and scope of the invention as set forth in the appended claims.

Moreover, no requirement exists for a device or method to address each and every problem sought to be resolved by the present invention, for such to be encompassed by the present claims. Furthermore, no element, component, or method step in the present disclosure is intended to be dedicated to the public regardless of whether the element, component, or method step is explicitly recited in the claims. No claim herein is to be construed under the provisions of 35 U.S.C. 112, sixth paragraph, unless the element is expressly recited using the phrase "means for."

INDUSTRIAL APPLICABILITY

The present invention applies industrially to consumer electronic devices. More particularly, the present invention applies industrially to individually portable multimedia devices available to the public. Even more particularly, the present invention applies to hand-held electronic devices for receiving and playback of digital audio, visual and numerical data and the means to interface such portable multimedia electronic devises to an appropriately configured radio or other device.

What is claimed is:

1. An apparatus for connecting a portable multimedia device having an internal power supply to a receiver for data play-back, comprising:
   a first communication link coupling the apparatus to the portable multimedia device;
   a scanner utilizing a transmitter coupled to a mixer to facilitate scanning radio frequencies to find a quiet carrier frequency and, upon detection of said quiet carrier frequency, indicating the detected quiet carrier frequency;
   the transmitter further to facilitate transmitting data to be carried over the detected quiet carrier frequency from the portable multimedia device to the receiver;
   a source of electric power selected from the group consisting of a vehicle power receptacle, a battery, a battery pack, a generator, and a commercial electric outlet, said source of electric power being connected with said apparatus; and
   circuitry to facilitate recharging said internal power supply located within said portable multimedia device power supply.

2. An apparatus as in claim 1 wherein the scanned radio frequencies are in the FM bandwidth.

3. An apparatus as in claim 1 wherein the first communication link is selected from the group consisting of a wireless connection and a hardwire connection.

4. An apparatus as in claim 1 wherein said scanner monitors the selected quiet frequency for the presence of a signal or excessive noise and automatically switches to another quiet frequency upon detection of said signal or noise.

5. An apparatus for connecting a portable multimedia device to a receiver for data play-back, comprising:
   communication link between the portable multimedia device and a radio frequency scanner utilizing a transmitter coupled to a mixer for detecting a quiet radio carrier frequency and for automatically wirelessly coupling the portable multimedia device to a receiver upon detection of said quiet carrier frequency;
   data transfer circuitry including the transmitter to facilitate conveying data from the portable multimedia device to the receiver;
   a source of electric power to facilitate providing power to the apparatus and the portable multimedia device.

6. An apparatus as in claim 5 wherein the connection between the apparatus and the portable multimedia device is a hardwire connection and wherein the hardwire connection further comprises a physical connector selected from at least one of the group consisting of an electrical plug, an electrical socket, a cradle, a holder, and a docking station.

7. An apparatus as in claim 5 wherein the source of electric power is selected from the group consisting of a vehicle power outlet, a battery, a battery pack, a generator, and a utility outlet.

8. An apparatus as in claim 7 further having circuitry to facilitate recharging the portable multimedia device power supply from the power means; and
   wherein the connection between the portable multimedia device and the radio frequency scanner is a hardwire connection having a physical connector selected from at least one of the group consisting of an electrical plug, an electrical socket, a cradle, a holder, and a docking station.

9. An apparatus as in claim 5 wherein the radio frequency scanner monitors the selected quiet carrier frequency for the presence of a signal or excessive noise and automatically switches to another quiet carrier frequency upon detection of said signal or noise.

10. A method for transmitting data play-back from a portable multimedia device to a receiver comprising the steps of:
   scanning a radio frequency band for a quiet frequency using a scanner which utilizes includes a transmitter coupled to a mixer;
   identifying said detected quiet frequency;
   setting the receiver to the indicated quiet carrier frequency;
   wirelessly transmitting data from the portable multimedia device to the receiver using the transmitter;
   providing at least one source of electric power to facilitate recharging the portable multimedia device power supply and to facilitate providing operating power for the portable multimedia device; and
   providing circuitry to facilitate recharging said internal power supply located within said portable multimedia device power supply.

11. A method as in claim 10 wherein connecting the portable multimedia device to the scanning means is by providing a hardwire connection
  wherein the hardwire connection has a physical connector selected from at least one of the group consisting of an electrical plug, an electrical socket, a cradle, a holder, and a docking station.

12. A method as in claim 10 wherein scanning radio frequencies includes scanning the FM radio frequency band.

13. A method as in claim 10 wherein the step of scanning continues to monitor the quiet frequency for a signal or noise and upon detection of said signal or noise automatically switches the wireless connection to another quiet frequency.

\* \* \* \* \*

UNITED STATES PATENT AND TRADEMARK OFFICE
CERTIFICATE OF CORRECTION

| | | |
|---|---|---|
| PATENT NO. | : 8,000,666 B2 | |
| APPLICATION NO. | : 11/690736 | |
| DATED | : August 16, 2011 | |
| INVENTOR(S) | : Le Thu Tran | |

It is certified that error appears in the above-identified patent and that said Letters Patent is hereby corrected as shown below:

In the specification:
Column 4, line 23, delete "1005" and replace with --1004--.
Column 6, line 55, Claim 10, please delete "includes".

Signed and Sealed this
Twenty-fifth Day of October, 2011

David J. Kappos
*Director of the United States Patent and Trademark Office*